(12) United States Patent (10) Patent No.: US 8,334,993 B2
Singh (45) Date of Patent: Dec. 18, 2012

(54) METHODS, SYSTEMS, AND COMPUTER PROGRAM PRODUCTS FOR ASSOCIATING AN IMAGE WITH A COMMUNICATION CHARACTERISTIC

(75) Inventor: Mona Singh, Cary, NC (US)

(73) Assignee: FotoMedia Technologies, LLC, Portsmouth, NH (US)

( * ) Notice: Subject to any disclaimer, the term of this patent is extended or adjusted under 35 U.S.C. 154(b) by 1428 days.

(21) Appl. No.: 11/365,411

(22) Filed: Mar. 1, 2006

(65) Prior Publication Data

US 2007/0206231 A1 Sep. 6, 2007

(51) Int. Cl.
*G06F 3/12* (2006.01)
*H04N 1/21* (2006.01)
*H04N 7/14* (2006.01)
*H04N 5/228* (2006.01)
*H04N 5/45* (2011.01)

(52) U.S. Cl. ............... 358/1.15; 358/302; 348/14.08; 348/208.14; 348/565

(58) Field of Classification Search ........... 358/302, 358/496, 300, 596, 462, 1.15, 1.18; 348/208.14, 348/231.2, 333.12, 565, 14.08
See application file for complete search history.

(56) References Cited

U.S. PATENT DOCUMENTS

| | | | | |
|---|---|---|---|---|
| 5,850,470 A * | 12/1998 | Kung et al. | ............... | 382/157 |
| 6,111,517 A | 8/2000 | Atick et al. | | |
| 6,636,873 B1 | 10/2003 | Carini et al. | | |
| 6,873,336 B1 | 3/2005 | Sailus et al. | | |
| 6,959,122 B2 | 10/2005 | McIntyre | | |
| 7,525,578 B1 * | 4/2009 | Barbeau | ............... | 348/231.3 |
| 2002/0039447 A1 | 4/2002 | Shniberg et al. | | |
| 2003/0072488 A1 | 4/2003 | Barsness et al. | | |
| 2003/0210808 A1 | 11/2003 | Chen et al. | | |
| 2004/0243671 A9 | 12/2004 | Needham et al. | | |
| 2004/0264810 A1 | 12/2004 | Taugher et al. | | |
| 2005/0015457 A1 | 1/2005 | Warasawa | | |
| 2005/0144049 A1 | 6/2005 | Kuzunuki et al. | | |
| 2007/0153091 A1 * | 7/2007 | Watlington et al. | ...... | 348/208.14 |

OTHER PUBLICATIONS

NISO Press Understanding Metadata 2004, National Information Standard Organization ISBN 1-880124-62-9.*
Marc Davis Metada Creation System for Mobile 2004 ACM Press 36-48.*
Metz, "Riya Alpha," PC Magazine, pp. 1-2 (Nov. 10, 2005).
Wilcox, "Managing Digital Collections," ERCIM News, No. 62, pp. 1-2 (Jul. 2005).
Burack, "Fujifilm Displays Face Recognition and Detection Ability; Available in New Electronic Photo Album," pp. 1-5 (Publication Date Unknown).
Girgensohn et al., "Leveraging Face Recognition Technology to Organize Photos," FX Palo Alto Laboratory, Inc., http://www.ee.columbia.edu/advent-seminar/columbia-mmwksp04/girgensohn.pdf, pp. 1-11 (Publication Date Unknown).

* cited by examiner

*Primary Examiner* — Benny Tieu
*Assistant Examiner* — Ngon Nguyen

(57) ABSTRACT

Methods, systems, and computer program products for associating an image with a communication characteristic are disclosed. According to one method, a content characteristic of a first image may be identified. Communication of the first image may be monitored to identify a communication characteristic of the first image. Further, the content characteristic may be associated with the communication characteristic. The association between the content and communication characteristics may be used to associate a second image having the content characteristic with the communication characteristic.

8 Claims, 6 Drawing Sheets

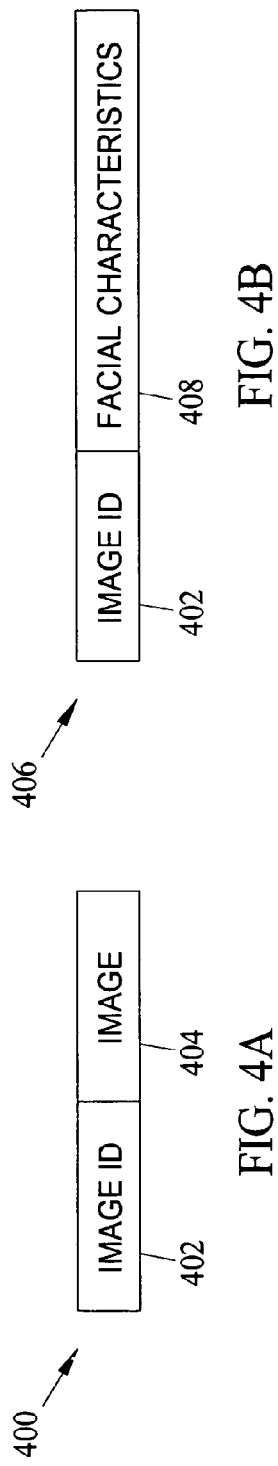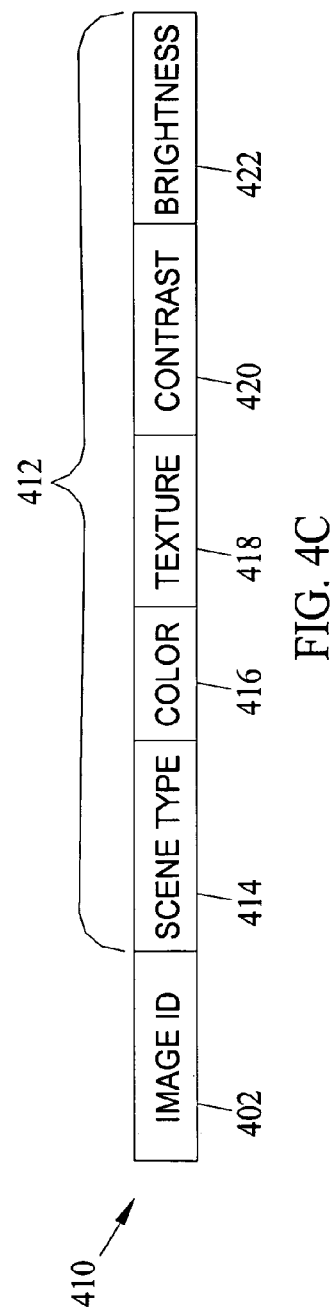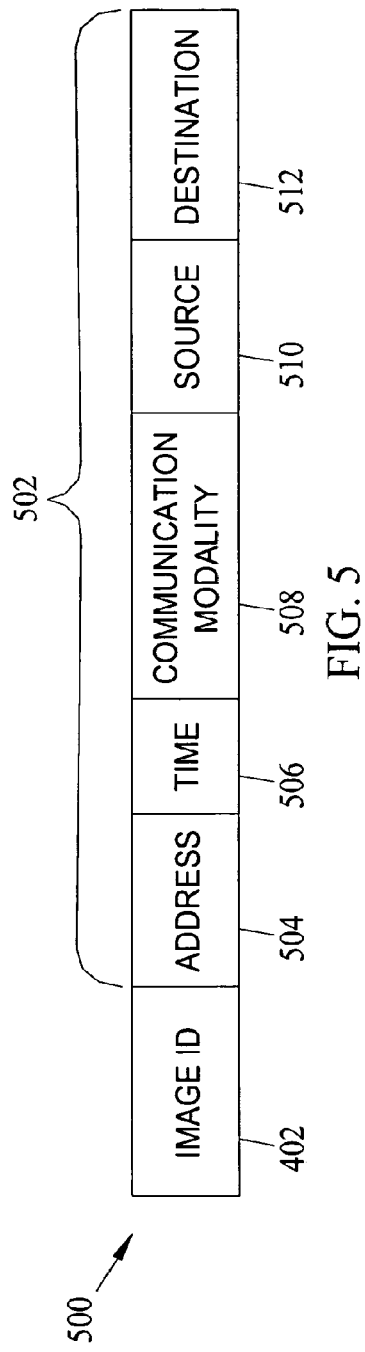

METHODS, SYSTEMS, AND COMPUTER PROGRAM PRODUCTS FOR ASSOCIATING AN IMAGE WITH A COMMUNICATION CHARACTERISTIC

TECHNICAL FIELD

The subject matter described herein relates to methods, systems, and computer program products for image communication. More particularly, the subject matter described herein relates to methods, systems, and computer program products for associating an image with a communication characteristic.

BACKGROUND

Digital photography has made the communication of images much easier than in the past. For example, a user may communicate or share an image with another by attaching the image to an e-mail message, posting the image on a website, sharing the image over an instant messaging network, or sharing the image via a mobile phone.

Typically, a user may desire to communicate the image to a particular destination or categorize the image with other images. In order to communicate the image, a user must enter a destination into a communication device or select a destination from a list in the device. The image can be categorized by creating or selecting a category and associating the image with the category.

The communication or organization of images for communication may be inconvenient and time-consuming process for a user. As a result, a user may long delay communicating or organizing images. Further, a user may fail to organize or communicate images at all due to the inconvenience of the task. Many service providers, such as mobile phone service providers, collect revenue when an image is communicated using their services. Therefore, it is desirable for service providers to provide more convenient techniques for communicating images.

One existing technique for communicating images is to let the user define an image object in a system and define a destination to send images containing the image object when the object is recognized in an image. The system may recognize the object in images and send those images to the destination when the object is recognized. This technique requires that the user predefine image objects and identify a destination for images including the image object. The user may be reluctant to input commands for defining image objects and identifying a destination due to the inconvenience of the task. Further, a user that sends images to many different destinations may be even more reluctant to enter the data necessary to implement this technique.

In view of the shortcomings of existing techniques for organizing and communicating images, there exists a need for improved methods, systems, and computer program products for associating an image with a communication characteristic.

SUMMARY

According to one aspect, the subject matter described herein includes a method for associating an image with a communication characteristic. The method includes identifying a content characteristic of a first image. Communication of the first image may be monitored to identify a communication characteristic of the first image. The method includes associating the content characteristic with the communication characteristic. Further, the method includes using the association between the content and communication characteristics to associate a second image having the content characteristic with the communication characteristic.

The subject matter described herein can be implemented as a computer program product comprising computer executable instructions embodied in a computer readable medium. Exemplary computer readable media suitable for implementing the subject matter described herein include disk memory devices, chip memory devices, application specific integrated circuits, and programmable logic devices. In addition, a computer program product that implements the subject matter described herein may be located on a single device or computing platform. Alternatively, the subject matter described herein can be implemented on a computer program product that is distributed across multiple devices or computing platforms.

BRIEF DESCRIPTION OF THE DRAWINGS

Exemplary embodiments of the subject matter will now be explained with reference to the accompanying drawings, of which:

FIG. 4A is a block diagram of an exemplary data structure including an image identifier and image data according to an embodiment of the subject matter described herein;

FIG. 4B is a block diagram of an exemplary data structure including an image identifier and facial characteristics data according to an embodiment of the subject matter described herein;

FIG. 4C is a block diagram of an exemplary data structure including an image identifier and scene characteristics according to an embodiment of the subject matter described herein; and FIG. 5 is a block diagram of an exemplary data structure for communication characteristics according to an embodiment of the subject matter described herein.

DETAILED DESCRIPTION

Figure 1:
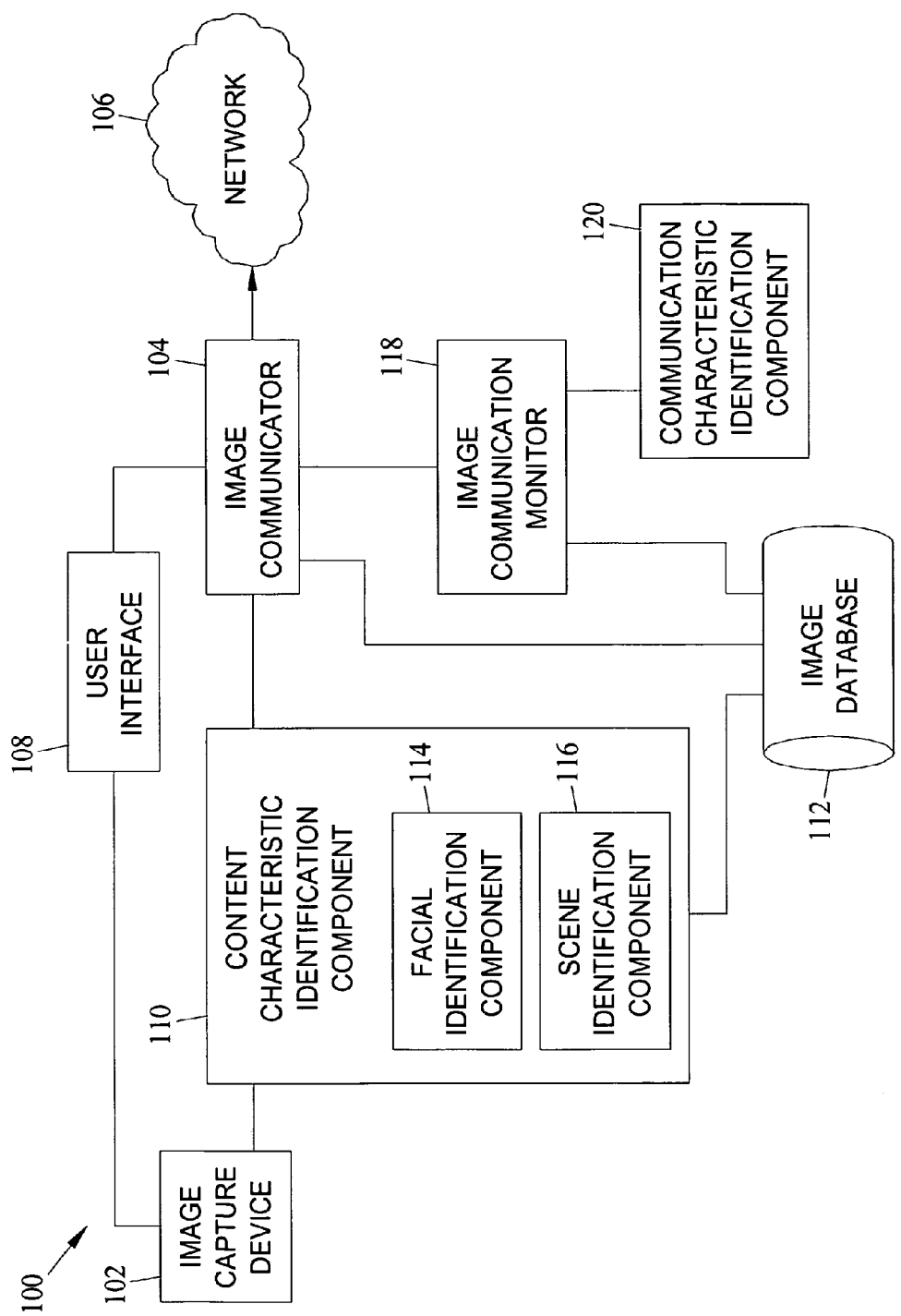
FIG. 1 is a block diagram of an exemplary computer system for associating an image with a communication characteristic according to an embodiment of the subject matter described herein.

According to one aspect, a system for associating an image with a communication characteristic may be implemented as hardware, software, and/or firmware components executing on or with one or more modules of a system operable to communicate an image. FIG. 1 illustrates an example of computer system 100 for associating an image with a communication characteristic according to an embodiment of the subject matter described herein. Computer system 100 may be any suitable system for communicating an image, such as a personal computer (PC), mobile phone, personal digital assistant, and the like. Further, computer system 100 may be operable to communicate the image over a network. The image may be a digital image or any other image suitable for communication. Computer system 100 may execute digital photo software for capturing images, receiving images, and storing images in a memory.

Computer system 100 may include an image capture device 102 with which an image is captured. Further, system 100 may include an image communicator 104 for receiving an image from a network 106. Device 102 may be operable to obtain an image with which content characteristics, such as facial and/or scene characteristics. Exemplary image capture devices include traditional film cameras, digital cameras, video cameras, digital video cameras, and the like. An image may be a digital photo and/or video or a traditional photo and/or video which is converted to digital format or any other suitable format that may be transmitted over a network.

Further, computer system 100 may include a user interface 108 by which a user inputs data. For example, user interface 108 may include a keyboard, a keypad, a touch screen interface, a tablet PC interface, or a mouse. The user can input commands into input interface 108 for obtaining images from capture device 102. User interface 108 may include a display for displaying images to the user. Further, user interface 108 may receive user commands for controlling communication of an image.

Computer system 100 may include means for identifying a content characteristic of an image. For example, system 100 may include a content characteristic identification component 110 for identifying one or more content characteristics of an image. Further, system 100 may store the identified content characteristic in an image database 112. Content characteristic identification component 110 may include a facial identification component 114 for identifying one or more facial characteristics in an image. For example, component 114 may identify a face in a captured image and determine a characteristic of the face. A person may be identified based on the facial characteristics in the image. Facial identification component 114 may be implemented using any suitable face recognition software, such as the product FACEVACS-SDK™ provided by Cognitec Systems Corporation of Herndon, Va. The FACEVACS-SDK product allows system integrators to integrate facial recognition into a broad range of applications. Programming interfaces that fit into .Net or C++ environments are provided.

Further, content characteristic identification component 110 may also include a scene identification component 116. For example, component 116 may identify a scene in a captured image and determine a characteristic of the scene, such as a scene type, color, texture, contrast, and brightness. Component 116 may be implemented using technology similar to the scene classification technology provided in the IMAGE INTELLIGENCE® (available from Fuji Photo Film Co., Ltd. of Japan) that automatically analyzes shooting conditions such as the light source, lighting direction, and exposure volume, as well as the subject itself by the detection of the facial areas, and infers from these the photographer's intention. Another example of technology that can be used to implement scene identification component 116 is the ISAPS® technology (available from Canon Kabushiki Kaisha Corporation of Japan) that provides for analyzing and classifying photographic scene data based on statistical relationships among focal length, focus distance, scene brightness, and other factors.

Image communicator 104 may be operable to communicate images. The images may be communicated over network 106, such as a wireless network (e.g., a cellular network), a local area network (LAN), a wide area network (WAN), or other suitable network. For example, image communicator 104 may receive an image captured by image capture device 102 or stored by image database 112 and send the image to a destination via network 106. A destination address may be included with the image for identifying a destination for the image. Further, an image may be sent to multiple destinations. A user may input commands into user interface 108 for operating image communicator 104 to transmit an image to a particular destination on network 106 or another network in communication with network 106.

Image communicator 104 may also receive images from network 106 or another network in communication with network 106. Received images may be displayed to a user via a display of user interface 108 and/or stored in image database 112. Further, content characteristic identification component 110 may determine a content characteristic of a received image, such as a facial characteristic of a face in the image and/or a scene characteristic of a scene in the image.

Image database 112 may store images captured by image capture device 102 and/or received by image communicator 104. Further, database 112 may store one or more content characteristics of the stored image with the stored image and associate the content characteristics with the image. Stored images may be identified with image identifiers, such as alphanumeric characters, but may also be identified by content characteristics associated with the images.

Computer system 100 may include means for monitoring communication of an image to identify a communication characteristic of the image. For example, system 100 may include an image communication monitor 118 for monitoring communication of an image. Monitor 118 may monitor the communication of images by image communicator 104. Image communication may be monitored for identifying one or more communication characteristics associated with images. Further, for example, system 100 may include a communication characteristic identification component 120 for identifying a communication characteristic of an image based on the monitoring. Component 120 may use monitor 118 for monitoring communication of images to identify a communication characteristic of the images. The communication characteristic may be an attribute of a communication action that was performed for the associated image. The communication action associated with an image may include attaching the image to an e-mail message, posting the image on a website, sharing the image over an instant messaging network, and/or sharing the image via a mobile phone. Exemplary communication characteristics may include a destination or source address for a communication, a time of a communication, a modality of a communication, an originator of a communication, and a receiver of a communication. Further, for example, a communication characteristic may include the action of not communicating an image.

Further, system 100 may include means for associating the content characteristic of an image with a communication characteristic of the image. For example, communication characteristic identification component 120 may store a communication characteristic in image database 112. The stored communication characteristic may be associated with an image identifier for identifying the image as having been communicated with the communication characteristic, but the stored communication characteristic may also be associated with one or more stored content characteristics associated with the image.

System 100 may include means for using an association between the content and communication characteristics of an image to associate a second image having the same content characteristic with the communication characteristic. For example, image capture device 102 or image communicator 104 may receive an image having the same content characteristic as a previously received image. Content characteristic identification component 110 may compare the content characteristics of two or more images for determining whether the images have the same or similar content characteristics. According to one embodiment, content characteristic identification component 110 may determine that the images have the same content by comparing one or more facial characteristics in the images to determine whether the facial characteristics are the same or similar. For example, image database 112 may include an image associated with particular facial characteristics. A captured image may include the same or similar facial characteristics as the image in image database 112. Content characteristic identification component 110 may determine that the image in database 112 and the captured image have the same content characteristics because the images include facial characteristics that are the same or similar. Database 112 may associate an image with a communication characteristic for one or more previously received images. The communication characteristic may be associated with an image identifier that identifies the image, but may also be associated with a stored content characteristic associated with the image. A communication action may be performed for the image based on the communication characteristic.

According to another embodiment, content characteristic identification component 110 may determine that the images have the same content by comparing one or more scene characteristics in the images to determine whether the scene characteristics are the same or similar. For example, component 110 may access a stored image having particular scene characteristics. A captured image may include the same or similar scene characteristics as the stored image. Component 110 may determine that that there is an association between the image in database 112 and the captured image because the images include scene characteristics that are the same or similar.

Image communicator 118 may be operable to perform a communication for an image corresponding to a communication characteristic associated with the image. For example, image communicator 118 may attach the image to an e-mail message and send the e-mail message, post the image on a website, share the image over an instant messaging network, and/or share the image via a mobile phone. Image communicator 118 may perform the action of not communicating an image.

Figure 2:
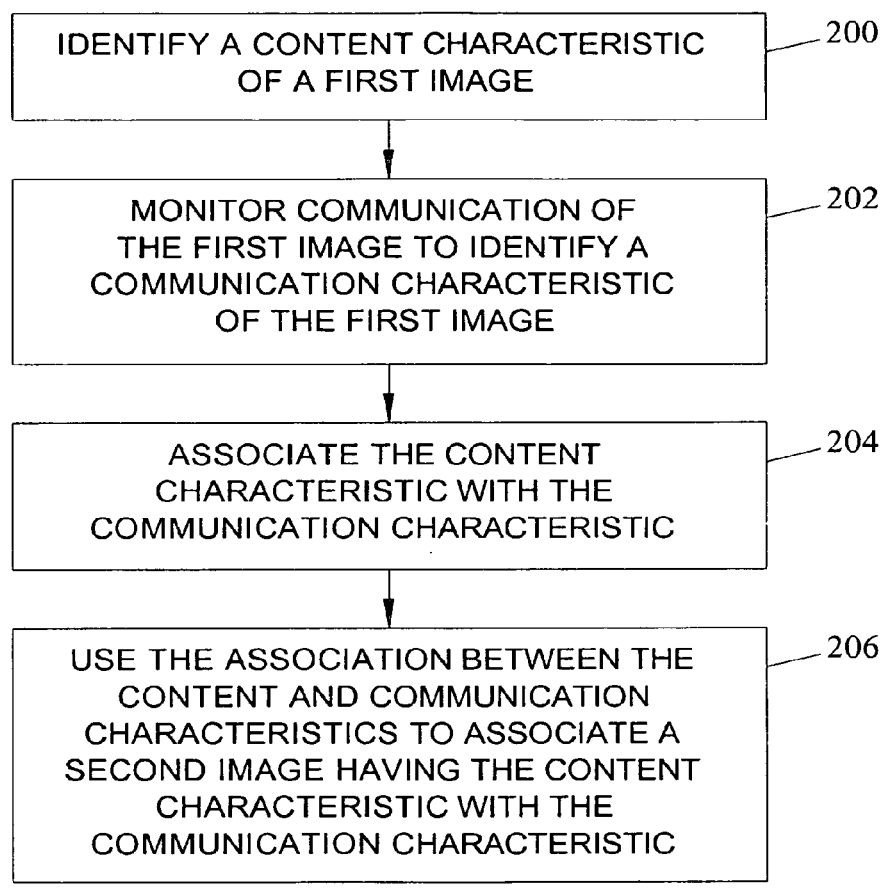
FIG. 2 is a flow chart of an exemplary process for associating an image with a communication characteristic according to an embodiment of the subject matter described herein.

FIG. 2 is a flow chart illustrating an exemplary process for associating an image with a communication characteristic according to an embodiment of the subject matter described herein. Referring to FIG. 2, in block 200, a content characteristic of a first image is identified. Communication of the first image may be monitored to identify a communication characteristic of the first image (block 202). In block 204, the content characteristic is associated with the communication characteristic. The association between the content and communication characteristics may be used to associate a second image having the content characteristic with the communication characteristic (block 206).

Figure 3A:
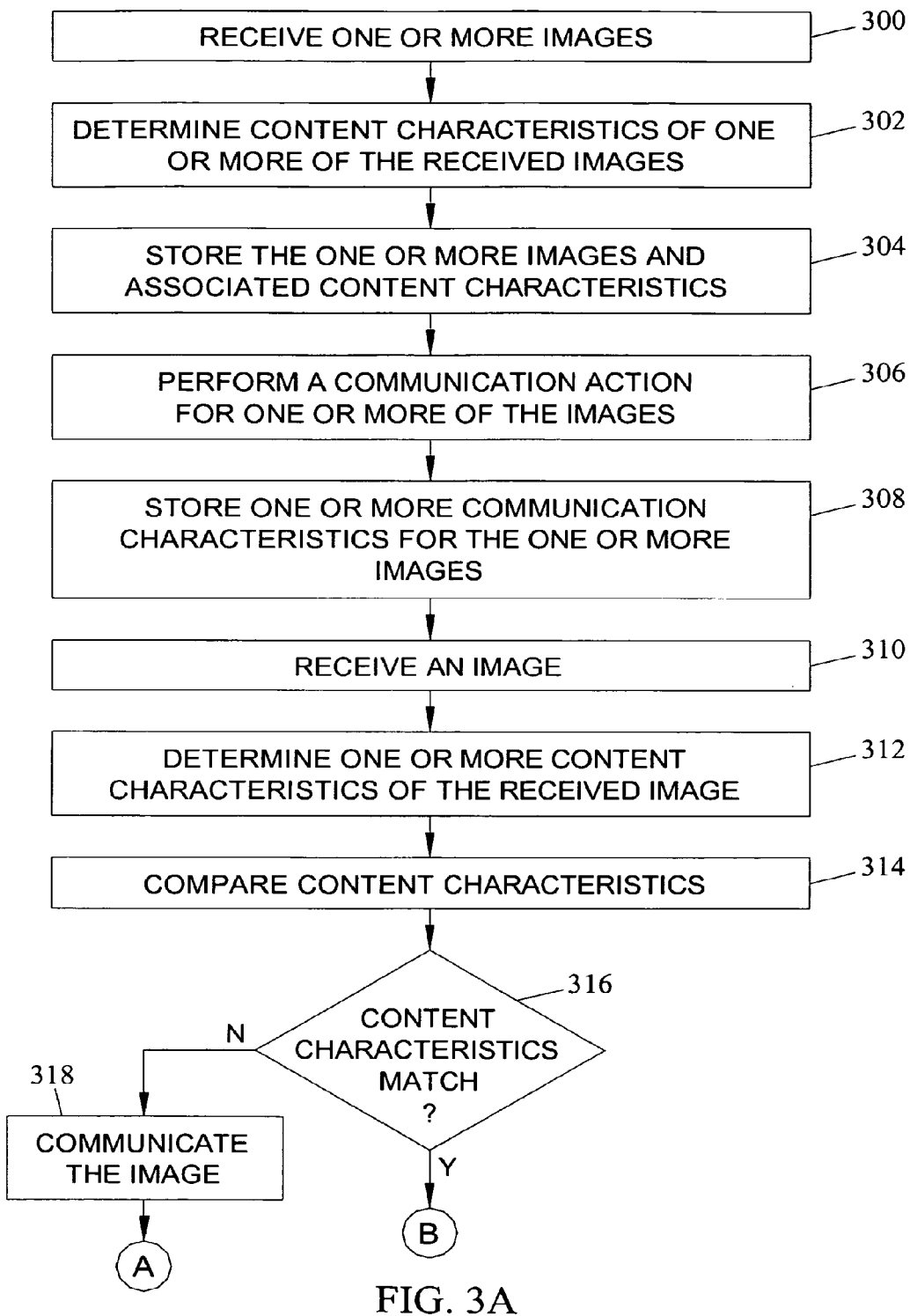
FIGS. 3A and 3B are a flow chart of another exemplary process for associating an image with a communication characteristic according to an embodiment of the subject matter described herein.
Figure 3B:
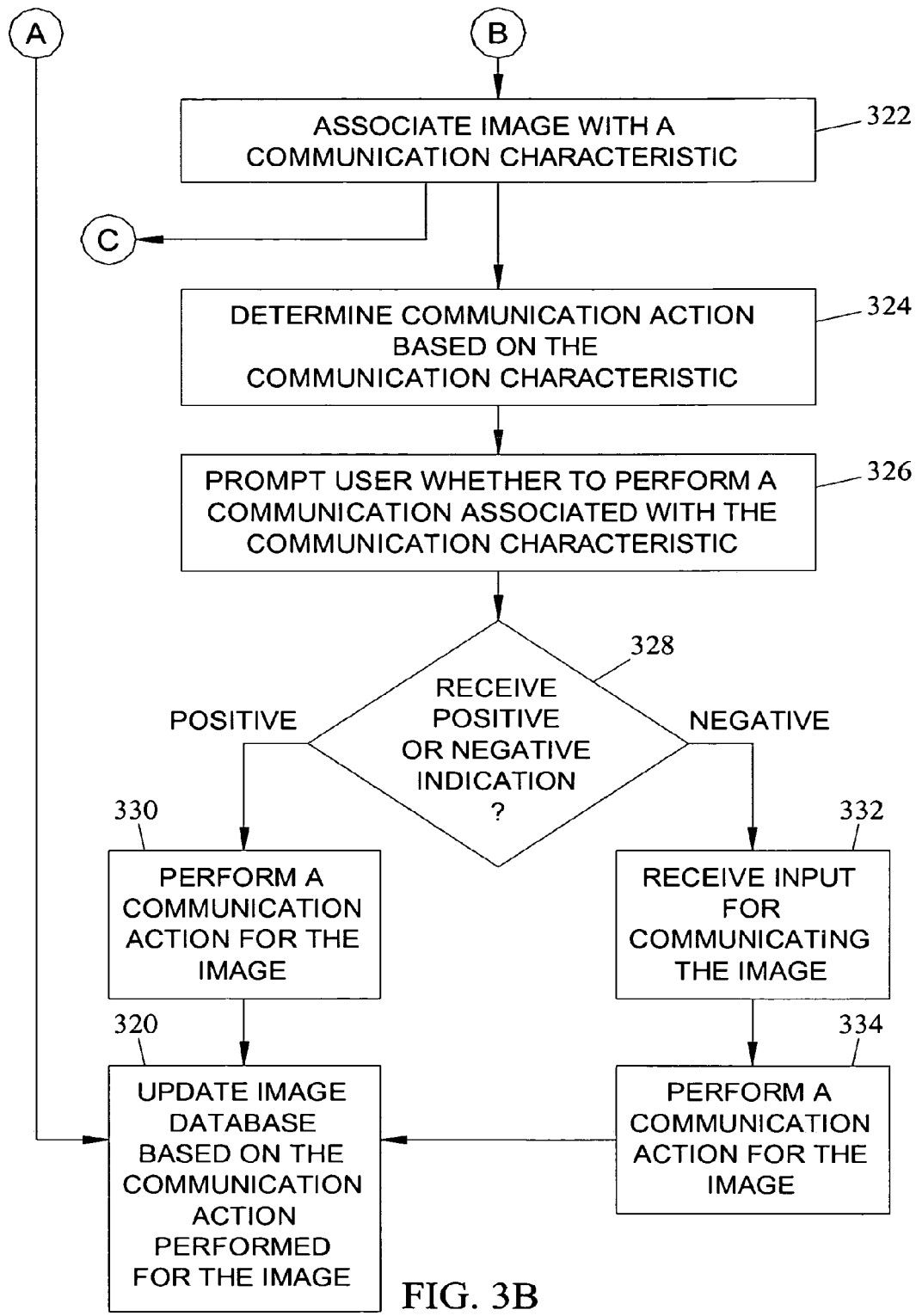

FIGS. 3A and 3B are a flow chart illustrating an exemplary process for associating an image with a communication characteristic according to an embodiment of the subject matter described herein. Referring to FIG. 3A, one or more images may be received by system 100 (block 300). For example, the images may be images captured by image capture device 102 and/or images received by image communicator 104 from network 106.

In block 302, content characteristic identification component 110 may determine content characteristics of one or more of the received images. For example, facial identification component 114 may determine one or more facial characteristics in the images. In another example, scene identification component 116 may determine one or more scene characteristics in the images. The images and associated content characteristics may be stored in image database 112 (block 304). Images having the same or similar content characteristics may be grouped together.

Based on the contents of an image, facial identification component 114 may determine a person's identity. The person's identify may be a content characteristic of the image. In addition to the commercially available facial recognition products described above, an exemplary method for face recognition is described in U.S. Pat. No. 6,111,517 to Atick et al. Briefly, this method includes applying multiscale search algorithms to search for faces in low resolution and switching to high resolution only when the low resolution search indicates a head-like shape. Once a face has been detected, the head's shape, position, size, and pose can be determined. Next, the head may be normalized by scaling, rotating, and warping, so that the face can be registered and mapped into a canonical size and pose. An internal representation scheme can be employed to translate facial data into a unique coded characterization of the face of each individual. Next, the facial characterization can be compared to stored facial characterizations to determine a match.

Recognized faces may be assigned a pseudo name for identifying the face. Further, a user may input a real name for recognized faces for associating a real name with a recognized face. Component 114 may use this method or any other suitable facial recognition method to determine a facial characteristic in an image. Further, scene identification component 116 may use a similar method for recognizing scene characteristics in images and image objects, such as a building, a car, or a ship.

Images and their associated content characteristics may be stored in image database 112 and identified by a unique image identifier. FIGS. 4A-4C illustrate block diagrams of exemplary data structures of an image database according to an embodiment of the subject matter described herein. Although the data structures depicted in FIGS. 4A-4C (and in FIG. 5 described below) illustrate that the various exemplary data records of database 112 may include a particular image identifier 402, this arrangement is merely exemplary. Alternatively, content characteristics may be stored in image database 112 and directly associated with corresponding communication characteristics without reference to any particular image data via an identifier, such as image identifier 402. The arrangement shown in these figures is but one example of how content and associated communication characteristics may be stored in database 112.

Referring to FIG. 4A, a data structure 400 includes an image identifier 402 and an image data 404. Image identifier 402 may include a unique identifier for identifying an image. Image data 404 may include the data of an image, such as digital image data.

Referring to FIG. 4B, a data structure 406 includes an image identifier 402 and facial characteristics data 408. Facial characteristics data 408 may include information for identifying facial characteristics in the image corresponding to image identifier 402. The image identifier may be used for associating the facial characteristics of the image with data of the image in database 112.

Referring to FIG. 4C, a data structure 410 includes an image identifier 402 and scene characteristics 412. Scene characteristics 412 may include information for identifying scene characteristics in the image corresponding to image identifier 402. The image identifier may be used for associating the scene characteristics of the image with data of the image in database 112. Exemplary scene characteristics include scene type data 414, color data 416, texture data 418, contrast data 420, and brightness data 422.

Table 1 below shows exemplary entries including an image identifier and scene characteristics that may be stored in an image database. It should be pointed out that image database 112 is a logical database that may be realized using any known information management and processing techniques, including, for example, relational databases, object-oriented databases, hierarchical databases, lookup tables, and the like.

TABLE 1

Exemplary Entries Including an Image Identifier and Scene Characteristics

| Image ID | Scene | Color | Texture | Contrast | Brightness |
|---|---|---|---|---|---|
| 1 | Stadium | Red | Soft | Medium | High |
| 2 | Stadium | Red | Fuzzy | High | Medium |
| 3 | Forest | Green | Sharp | Medium | Low |
| 4 | Forest | Green | Sharp | Low | High |

In Table 1, an image corresponding to image identifier 1 may include a stadium scene, a red color, a soft texture, a medium contrast, and a high brightness. An image corresponding to image identifier 2 may include a stadium scene, a red color, a fuzzy texture, a high contrast, and a medium brightness. An image corresponding to image identifier 3 may include a forest scene, a green color, a sharp texture, a medium contrast, and a low brightness. An image corresponding to image identifier 4 may include a forest scene, a green color, a sharp texture, a low contrast, and a high brightness. Scene identification component 116 may include functionality for identifying a scene, a color, a texture, a contrast, and a brightness of an image, as described above.

Referring again to FIG. 3A, in block 306, image communicator 104 may perform a communication action for one or more of the images. For example, image communicator 104 may receive instructions for communicating one or more images to network 106. A user may input commands into user interface 108 for communicating an image. The image may be communicated by attaching the image to an e-mail message, posting the image on a website, sharing the image over an instant messaging network, and/or sharing the image via a mobile phone. In another example for performing a communication action, image communicator 104 may receive instruction for not communicating one or more images. In this example, a user may input commands into user interface 108 to not communicate an image.

In block 308, one or more communication characteristics for the one or more images may be stored in image database 112. For example, image communication monitor 118 may monitor communication of one or more images. Communication characteristic identification component 120 may identify one or more communication characteristics based on the monitoring and storing of the communication characteristics in database 112. The communication characteristics may be characteristics of the communication actions performed for images. The stored communication characteristics may identify associated images by a unique image identifier, but may be associated with one or more content characteristics in database 112 without reference to any particular image data or image identifier. Communication characteristics may be an attribute of a communication action performed for the associated image. Exemplary communication characteristics include whether the user has sent the image to or received the image from a particular destination or source address, destination or source data, such as to whom an image was sent or received, when an image was received or sent, and the time lag between when an image was created and when the image was sent by the user to a specified recipient or received by the user from another address.

FIG. 5 illustrates a block diagram of an exemplary data structure for communication characteristics according to an embodiment of the subject matter described herein. Referring to FIG. 5, a data structure 500 may include an image identifier 402 and communication characteristics data 502. Communication characteristics data 502 may include information for identifying communication characteristics in the image corresponding to image identifier 402. Exemplary communication characteristics include address data 504, time data 506, communication modality data 508, source data 510, and destination 512. Address data 504 may include a source address from which images having certain image characteristic have been received, a destination address to which such images have been sent, or both. Alternatively, one or more of communication characteristics data 502, such as address data 504, may be used to index data structure 500 for purposes of associating communication characteristics data 502 with the appropriate facial characteristics data 408 and scene characteristics data 412. Table 2 below shows exemplary entries includes an image identifier and communication characteristics that may be stored in an image database.

TABLE 2

Exemplary Entries Including an Image Identifier and Communication Characteristics

| Image ID | Destination Address | Date/Time | Communication Modality | Sender Name | Receiver Name |
|---|---|---|---|---|---|
| 1 | e@m.com | Jan. 1, 2006 | MMS | User 1 | User 8 |
| 2 | 111-834-2231 | Jul. 4, 2004 | Cell | User 1 | User 4 |
| 3 | lmn@pqo.com | Dec. 25, 2003 | E-mail | User 2 | User 3 |

In Table 2, an image corresponding to image identifier 1 may include a destination e-mail address of e@m.com, a communication date of Jan. 1, 2006, a multimedia messaging service (MMS) communication modality, a sender name of User 1, and a receiver name of User 8. An image corresponding to image identifier 2 may include a destination telephone number of 111-834-2231, a communication date of Jul. 4, 2004, a communication modality of a device suitable for communicating on a cellular network, a sender name of User 1, and a receiver name of User 4. An image corresponding to image identifier 3 may include a destination e-mail address of lmn@pqo.com, a communication date of Dec. 25, 2003, a communication modality of a device suitable for communicating e-mail, a sender name of User 2, and a receiver name of User 3. Communication characteristic identification component 120 may include functionality for identifying a communication's destination address, date and/or time, modality, sender name, and/or receiver name.

Referring again to FIG. 3A, in block 310, system 100 may receive another image. System 100 may receive the image from image capture device 102 or from network 106. Content characteristic identification component 110 may determine one or more content characteristics of the received image (block 312). For example, the one or more characteristics may include facial characteristics and/or scene characteristics.

According to one embodiment, a plurality of content characteristics may be identified in the image received in block 310. A corresponding plurality of communication characteristics may be associated with the plurality of content characteristics. For example, other images (such as the images received in block 300) may include one or more of the content characteristics and be associated with a plurality of communication characteristics. A majority voting method may be used to determine which of the plurality of communication characteristics to associate with the image received in block 310. For example, the image received in block 310 may be associated with a communication characteristic of an image having most of the content characteristics of the image received in block 310.

Content character identification component 110 may compare a content characteristic of the image received in block 310 to a stored content characteristic of a previously received image (block 314) to determine whether there is a content match (block 316). If there is not a match of the content characteristics, the image received in block 310 may be communicated (block 318). The image may be communicated based on user input. The content characteristic of the image received in block 310 may also be stored and associated with a plurality of previously receive images having the same and/or similar content characteristics.

In block 320 of FIG. 3B, image database 112 may be updated based on the communication action performed for the image. For example, a content characteristic for the image may be stored in database 112 and associated with a communication characteristic of the communication action performed for the image. The stored content characteristic and communication characteristic may be associated with subsequently received images having a matching content characteristic. As a result, when an image having a matching content characteristic is received, the received image may be matched to the image associated with a communication characteristic and then matched to the communication characteristic associated with the image.

Referring again to FIG. 3A, if there is a match of the content characteristics in block 316, the image received in block 310 may be associated with a communication characteristic of one or more images having a matching content characteristic (block 322). The association may include storing the communication characteristic with an image identifier identifying the image, but may include storing the communication characteristic with an identifier of the matching content characteristic(s).

Further, in block 324, a communication action may be determined based on the communication characteristics of one or more images having matching content characteristics. The communication action may include one or more of the communication characteristics. For example, the communication action may be attaching the image to an e-mail to a particular destination. In one example, one or more images having the same or similar content characteristics may be grouped and communicated together.

Alternatively, a plurality of communication actions may be suggested to a user based on matches for content characteristics. For example, the user may be prompted to select a communication action from among the communication actions corresponding to the best matches for content characteristics.

In block 326, the user may be prompted whether to perform the communication action for the image received in block 310 associated with the communication characteristic. The communication characteristic may be a communication characteristic of a communication action previously performed for an image having the same content characteristic as the image received in block 310. A display of user interface 108 may display the prompt to a user. In one example, images grouped together with the same or similar content characteristics may be presented to the user with a communication action for allowing the user to select whether to perform the recommended communication action.

In block 328, system 100 may receive a positive indication or a negative indication to the prompting in block 326. If a positive indication is received, a communication action may be performed for the image (block 330). The communication action performed for the image may have the communication characteristic associated with the image. For example, the communication characteristic associated with the image may be to send the image to a particular e-mail destination. In this example, the communication action includes attaching the image to an e-mail and sending the e-mail to the identified destination. Image database 112 may be updated based on the communication action performed for the image (block 320).

If a negative indication is received at block 328, system 100 may receive input for communicating the image (block 332). For example, a user may input commands into user interface 108 for performing an alternate communication action for the image. The alternate communication action may be performed for the image (block 334).

In block 320, image database 112 may be updated based on the communication action performed for the image. According to one embodiment, other images stored in database 112 and having the same content characteristic as the image received at block 326 may be associated with the communication characteristic. Alternatively, the association between content and communication characteristics may be directly updated in database 112 without reference to any particular image or image identifier.

According to one embodiment, image may be grouped and sent according to content characteristics. For example, images having the same or similar content characteristics may be collected over a period of time and communicated as a group to a common destination. The content characteristics of the images may be associated with a common communication characteristic. For example, all images including a particular person may be communicated via e-mail to the person identified in the images. The e-mail may be sent to the person after a predetermined period of time or after a predetermined number of the images including the person are collected. Further, the communication of the group of images may be suggested to a user before communicating the group. The user may indicate whether or not to communicate the images.

In one exemplary scenario, a user may take pictures with a camera on a regular basis. In one instance, the user takes pictures when his nieces and nephews visit, and when they attend a sporting event with the user. In another instance, the user takes pictures when he visits his parent in Las Vegas. In yet another instance the user takes pictures when he visits an aunt and uncle. Further, in another instance, the user takes pictures of friends at a social event. In accordance with the subject matter described herein, when the user uploads the pictures to his computer including the technology described herein, the technology may provide suggestions for whom to send the captured pictures to, and suggested methods for communicating the pictures. The pictures can be organized in groups for automatic sending according to faces in the pictures and/or scenes in the pictures. The technology can suggest destinations for sending the groups to different destinations. For example, pictures of the user's nieces and nephews may sent by e-mail to his mother's e-mail account based on previous pictures matching the nieces and nephews faces having been sent there. Further, the images may be grouped according to the mode of communication on the user's device. For example, one picture from a game that includes the faces of a number of players and was sent to a friend by MMS via his mobile phone in previous communications can be grouped with the pictures sent in those communications for easy retrieval or reference.

Figure 3C:
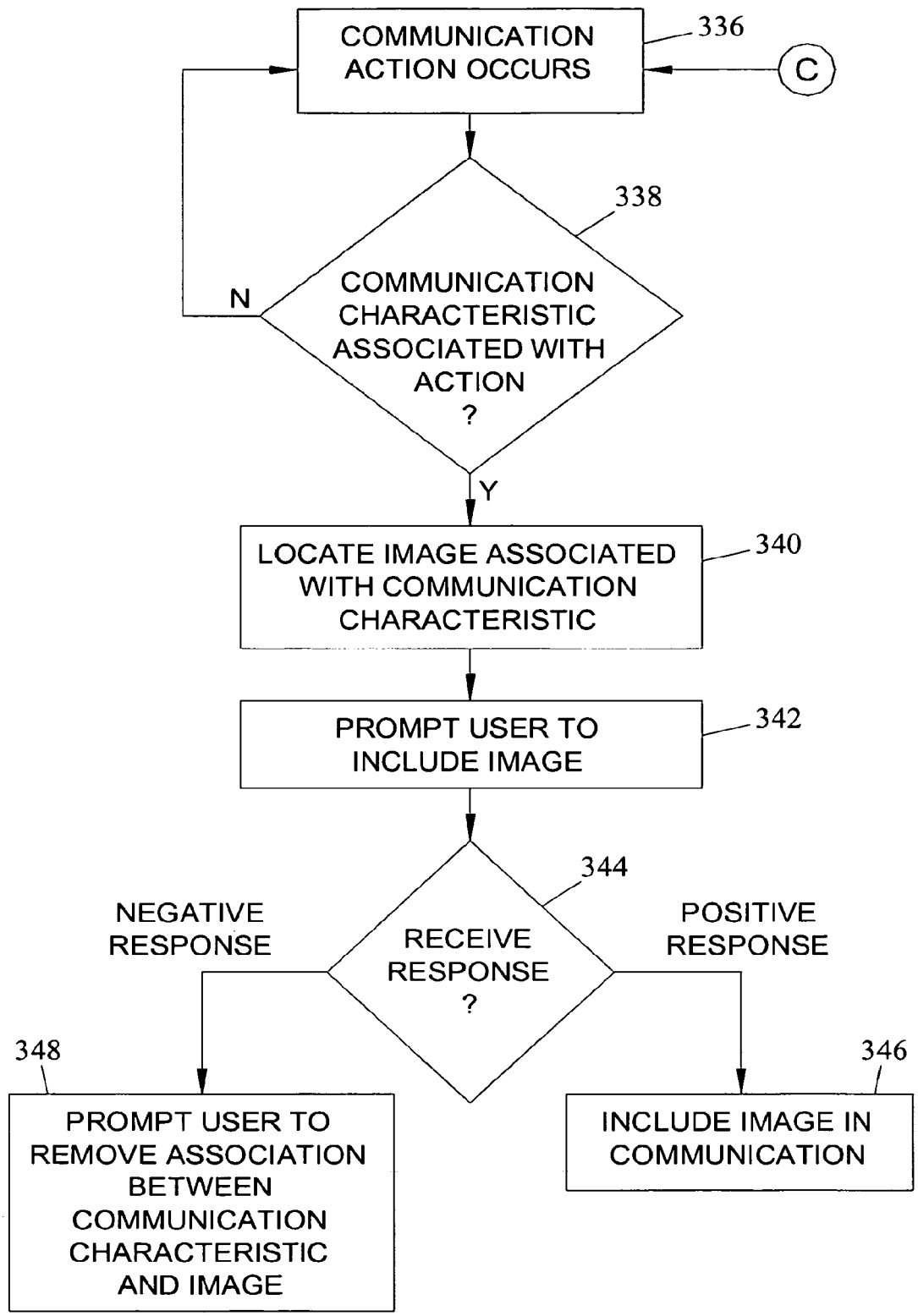
FIG. 3C is a flow chart of an alternative embodiment of the process shown in FIGS. 3A and 3B.

Instead of, or in addition to, suggesting to a user a plurality of communication actions to perform on an image based on matches for content characteristics, FIG. 3C depicts another embodiment in which an image may be suggested to the user for inclusion in a communication based on a communication characteristic of a communication action. Monitor 118 may be operable to implement or control the implementation of the processes described with respect to FIG. 3C.

According to the exemplary embodiment, in response to an occurrence of a communication action associated with the communication characteristic in block 336 a determination may be made in block 338 as to whether the communication characteristic associated with the image is also associated with the communication action. In block 340, the association between the communication characteristic and the image may be used to locate the image. The user may then be prompted in block 342 as to whether to include the image in a communication characteristic associated with the communication action when the communication characteristic is associated with the communication action. Prompting the user may include displaying the image upon occurrence of the communication action. An indication as to whether to include the image in the communication may be received at block 344. The image may be included in the communication at block 346 when a positive indication is received at block 344. Otherwise, the user may be prompted at block 348 as to whether to remove the association between the content characteristic and the communication characteristic when a negative indication is received at block 344. Database 112 may then be updated accordingly.

In a related exemplary scenario, a user may have images that could potentially be sent to the user's mother. In this example, the user may start to compose an e-mail message to his mother. The arrangement described above may identify the e-mail address of the user's mother as a communication characteristic of the message, and determine that the address is one to which images of the user's nieces and nephews have been sent in the past. The arrangement can then identify a set of images having the e-mail address as an associated communication characteristic. The arrangement can then prompt the user to send one or more of the identified set of images to his mother's address in the e-mail message. Thus, the action of creating a new message to a particular recipient serves as a trigger for finding images that may be appropriate to send to a certain recipient.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for associating an image with a communication characteristic, the method comprising:
    receiving a first image;
    analyzing the first image to identify a content characteristic of the first image;
    receiving user input resulting in a communication including identifying the first image, the communication associated with a communication action having a communication characteristic that identifies a recipient associated with the communication;
    receiving a second image;
    analyzing the second image to identify the content characteristic of the first image in the second image;
    prompting a user as to whether to include the second image in second communication associated with the communication action, wherein prompting the user includes providing information identifying the communication characteristic of the first image based on the identified content characteristic; and
    receiving, in response to providing information identifying the communication characteristic, user input resulting in the second communication associated with the communication action, wherein the second communication includes the communication characteristic that identifies the recipient and includes the second image,
    wherein at least one of the preceding actions is performed on at least one hardware component.

2. The method of claim 1 wherein receiving the first image includes receiving the first image over a network.

3. The method of claim 1 wherein the communication action includes providing the first image for posting on a website page associated with the recipient.

4. The method of claim 1 wherein the communication characteristic includes a receiver name that identifies the recipient.

5. The method of claim 1 wherein analyzing the first image to identify the content characteristic of the first image includes identifying a facial characteristic of a subject present in the first image.

6. The method of claim 5 wherein the subject present in the first image is associated with a receiver name that identifies the recipient.

7. The method of claim 1 comprising grouping a plurality of images having a same content characteristic.

8. A computer program product comprising computer executable instructions tangibly embodied in a computer readable medium for performing steps comprising:
    receiving a first image;
    analyzing the first image to identify a content characteristic of the first image;
    receiving user input resulting in a communication including the first image, the communication associated with a communication action having a communication characteristic that identifies a recipient associated with the communication;
    receiving a second image;
    analyzing the second image to identify the content characteristic of the first image in the second image;
    prompting a user as to whether to include the second image in a second communication associated with the communication action, wherein prompting the user includes providing information identifying the communication characteristic of the first image based on the identified content characteristic; and
    receiving, in response to providing information identifying the communication characteristic, user input resulting in the second communication associated with the communication action, wherein the second communication includes the communication characteristic that identifies the recipient and includes the second image.

* * * * *

UNITED STATES PATENT AND TRADEMARK OFFICE
CERTIFICATE OF CORRECTION

| | | |
|---|---|---|
| PATENT NO. | : 8,334,993 B2 | Page 1 of 1 |
| APPLICATION NO. | : 11/365411 | |
| DATED | : December 18, 2012 | |
| INVENTOR(S) | : Singh | |

It is certified that error appears in the above-identified patent and that said Letters Patent is hereby corrected as shown below:

On the Title Page, in Item (56), under "OTHER PUBLICATIONS", in Column 2, Line 3, delete "Metada" and insert -- Metadata --, therefor.

In the Specifications:

In Column 5, Line 36, delete "118" and insert -- 104 --, therefor.

In Column 5, Line 39, delete "118" and insert -- 104 --, therefor.

In Column 5, Line 43, delete "118" and insert -- 104 --, therefor.

In Column 8, Line 52, delete "Imn@pqo.com," and insert -- lmn@pqo.com, --, therefor.

Signed and Sealed this
Twenty-eighth Day of May, 2013

Teresa Stanek Rea
*Acting Director of the United States Patent and Trademark Office*